(12) United States Patent
Bestgen et al.

(10) Patent No.: US 9,889,704 B2
(45) Date of Patent: Feb. 13, 2018

(54) FOLDABLE TIRE, METHOD AND USE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Luc Bestgen, Clermont-Ferrand (FR); Florian Vilcot, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 414 days.

(21) Appl. No.: 14/402,785

(22) PCT Filed: May 15, 2013

(86) PCT No.: PCT/EP2013/060008
§ 371 (c)(1),
(2) Date: Nov. 21, 2014

(87) PCT Pub. No.: WO2013/174687
PCT Pub. Date: Nov. 28, 2013

(65) Prior Publication Data
US 2015/0144272 A1    May 28, 2015

(30) Foreign Application Priority Data
May 24, 2012  (FR) ..................... 12 54735

(51) Int. Cl.
*B60C 3/08* (2006.01)
*B60C 19/00* (2006.01)
(Continued)

(52) U.S. Cl.
CPC ............. *B60C 3/08* (2013.01); *B60C 25/14* (2013.01)

(58) Field of Classification Search
CPC ...... B60C 3/08; B60C 15/04; Y10T 29/49826
(Continued)

(56) References Cited

U.S. PATENT DOCUMENTS 3,139,135 A * 6/1964 Frisby ............... B29D 30/10
152/457
3,570,572 A * 3/1971 Cardenas .............. B60C 5/00
152/457
(Continued)

FOREIGN PATENT DOCUMENTS

FR    2348065      11/1977
JP    52-22204      2/1977
(Continued)

OTHER PUBLICATIONS

Allen, John S. "To Compact a Non-Folding Bicycle Tire for Storage" (2006), http://www.truewheelers.org/mechtips/ Viewed Jun. 8, 2017.*

(Continued)

*Primary Examiner* — Sarang Afzali
*Assistant Examiner* — Darrell C Ford
(74) *Attorney, Agent, or Firm* — Dickinson Wright, PLLC

(57) ABSTRACT

A collapsible tire for a passenger vehicle, comprising at least one carcass reinforcement optionally associated with an inextensible crown reinforcement, itself radially on the inside of a tread, two beads and two sidewalls, said beads comprising at least one inextensible circumferential reinforcing element called a bead wire, said bead wire defining, when free of any stress, a mean line forming a substantially circular closed curve in a circumferential plane, wherein the invention is characterized in that the bead wire of each bead (Continued)

is flexible, wherein after the tire has been collapsed, the mean line of the bead wire simultaneously defines a first curvature, and a second curvature, the first and second curvatures being connected together by a third connecting curvature, the projection of said first, second and third curvatures of the collapsed tire onto an axial plane defining the two-dimensional envelope by way of a total perimeter P of less than or equal to $[3 \times (2H+A)]$, H being the height of the sidewall and A the width of the tire, and a collapsing method for the tire.

4 Claims, 5 Drawing Sheets

(51) Int. Cl.
  *B60C 25/14* (2006.01)
  *B60C 5/00* (2006.01)
  *B60C 15/00* (2006.01)
  *B60C 15/04* (2006.01)
(58) Field of Classification Search
  USPC .............................. 29/428; 152/540; 245/1.5
  See application file for complete search history.

(56) References Cited

U.S. PATENT DOCUMENTS

| | | | | |
|---|---|---|---|---|
| 4,057,091 A * | 11/1977 | Gardner | ................... | B60C 3/08 152/457 |
| 4,116,255 A * | 9/1978 | Hayakawa | ............. | B29D 30/00 152/457 |
| 4,177,851 A * | 12/1979 | Gill | ........................ | B60C 3/08 152/152 |
| 4,261,406 A * | 4/1981 | Chemizard | ............ | B29D 30/00 152/152 |
| 5,685,927 A * | 11/1997 | Hammond | ................ | B60C 3/00 152/209.26 |
| 6,345,655 B1 * | 2/2002 | Kustas | ...................... | B60C 3/08 152/450 |
| 6,367,528 B1 * | 4/2002 | Colantonio | ............. | B60C 19/00 116/34 R |
| 2003/0150538 A1 * | 8/2003 | Ceretta | ................. | B60B 21/026 152/158 |
| 2012/0298278 A1 * | 11/2012 | Wright | ................... | B60C 15/04 152/552 |
| 2014/0215793 A1 * | 8/2014 | Bestgen | .................... | B60C 3/08 29/428 |
| 2015/0144272 A1 * | 5/2015 | Bestgen, Jr. | ............ | B60C 25/14 157/1.24 |
| 2015/0183269 A1 * | 7/2015 | Laurent | .................. | B60C 15/04 29/894.3 |

FOREIGN PATENT DOCUMENTS

| | | |
|---|---|---|
| JP | 2-139447 A | 5/1990 |
| JP | 6-278415 A | 10/1994 |

OTHER PUBLICATIONS

Allen, John S. "To Compact a Non-Folding Bicycle Tire for Storage" (2006), recoveredf rom the Internet Archive, Viewed Jun. 8, 2017.*

International Search Report for PCT/EP2013/060008 Dated Jul. 27, 2013.

* cited by examiner

FOLDABLE TIRE, METHOD AND USE

This application is a 371 national phase entry of PCT/EP2013/060008, filed 15 May 2013, which claims benefit of the filing date of French Patent Application Serial No. 1254735, filed 24 May 2012, the entire contents of which are incorporated herein by reference for all purposes.

BACKGROUND

1. Field

The disclosure relates to a collapsible tire, to a method of collapsing and to the use thereof for a passenger vehicle.

2. Description of Related Art

The following definitions apply in what follows:
- a "circumferential plane" means a plane perpendicular to the axis of rotation of the tire,
- an "equatorial plane" means a circumferential plane passing through the middle of the tread surface of the tire, and
- an "axial plane" means a plane containing the axis of rotation of the tire,
- an "axial direction" means a direction parallel to the axis of rotation of the tire,
- a "radial direction" means a direction intersecting the axis of rotation of the tire and perpendicular thereto,
- a "circumferential direction" means a direction tangential to the surface of the tread in the direction of rotation of the tire,
- "radially on the inside of" means closer to the axis of rotation of the tire,
- "radially on the outside of" means further from the axis of rotation of the tire,
- "axially on the inside of" means closer to the equatorial plane,
- "axially on the outside of" means further away from the equatorial plane.

A tire comprises a tread intended to come into contact with the ground via a tread surface, extending radially towards the inside in the form of two sidewalls connected to two beads intended to provide the connection between the tire and a rim.

A radial tire more particularly comprises a reinforcing structure comprising a crown reinforcement, radially on the inside of the tread, and a radial carcass reinforcement, radially on the inside of the crown reinforcement.

The carcass reinforcement usually comprises at least one layer of reinforcing elements which consists of threads substantially parallel to one another and usually making, with the circumferential direction, an angle of between 85° and 95°. The carcass reinforcement is, in most tires, and in each bead, wound from the inside towards the outside of the tire around a circumferential reinforcing element called a bead wire to form a turn-up. The bead wire may be formed of an assembly of elementary threads or of cords, themselves formed of an assembly of elementary threads.

The crown reinforcement generally comprises several crown reinforcement layers. These layers most often consist of metal reinforcing elements embedded in an elastomeric material.

In the case of a tire for a passenger vehicle, the thickness of the crown reinforcement, which essentially consists of the radial stack of the crown reinforcement and of the carcass reinforcement, is usually between 2 and 7 mm. A sidewall of a tire for a passenger vehicle generally has a thickness of between 2.6 and 7 mm.

A cross-ply tire differs from a tire built with radial tire technology in that there are at least two crossed carcass plies making angles other than 90° with respect to the circumferential direction of the tire. The plies are said to be "crossed" because the angles are of opposite sign from one ply to the other.

A collapsible tire for a bicycle, comprising a carcass reinforcement each end of which is anchored in two beads by being turned up around a reinforcing element called a bead wire is already known from document WO 10/100088. Each bead is extended radially by sidewalls which join to a tread. This tire comprises a bead wire formed by winding a saturated and unwrapped metal cord formed of filaments.

A collapsible tire mounted on a rim, for vehicles such as motor vehicles, is also known, from document FR 2,348,065. This tire comprises a substantially annular tread situated centrally, and sidewalls which extend the tread and end in inextensible beads, which means beads the bead wire of which has a high level of circumferential rigidity. When the tire is deflated, the sidewalls can be bent inwards towards one another so as to be practically flattened inside the tire in relation to the tread.

Finally, document U.S. Pat. No. 4,057,091 also discloses the collapsing of a tire for a motor vehicle when it is mounted on a rim. In such a combination and when deflated, the tire can be flattened by folding its sidewalls in on themselves towards this rim.

However, such tire collapsing configurations for motor vehicles assume the rim still to be present, and still occupy a great deal of space and exhibit a high weight due to the presence of the rim.

Moreover, when the tires are manufactured at production sites distant from the sales sites it is necessary to transport them. When they are being transported, even if compressed together, the tires still occupy a substantial volume.

Specifically, one mode of packaging currently employed is first of all to lay a first row of tires vertically and in a line to make an angle of inclination with the ground so that they are partially superposed. Other tires are then incorporated and pushed into that part of the hole of each tire of the first row that has been left free, thus forming a second row. Such a mode of packaging allows 30% more tires to be packed in per $m^3$ by comparison with a layout in which the tires are placed side by side without deformation.

Hence, there is still a need to be able to package one or more tires, of the radial type or cross-ply type, for a motor vehicle, not mounted on rims, in a more or less compact manner for the time they spend in transport and/or in storage, and without damaging their internal structure while at the same time allowing them to revert very quickly back to their initial shape when they are no longer collapsed and have been inflated.

SUMMARY

One subject of the invention is a collapsible tire for a vehicle, comprising at least one carcass reinforcement optionally associated with an inextensible crown reinforcement, itself radially on the inside of a tread, said reinforcements each consisting of at least one layer of reinforcing elements, said tread being connected to two beads by two sidewalls, said beads being intended to come into contact with a rim, each bead comprising at least one inextensible circumferential reinforcing element called a bead wire, said bead wire defining a mean line forming a substantially circular closed curve in a circumferential plane, said sidewalls having a thickness of between 2.6 and 7 mm and said crown reinforcement having a thickness of between 2 and 7 mm.

The tire is characterized in that the bead wire of each bead is flexible, and in that after the tire has been collapsed, the mean line of the bead wire simultaneously defines a first curvature defined in the equatorial plane and having a first helix pitch extending anticlockwise in the axial plane, and a second curvature defined in said equatorial plane and having a second helix pitch extending clockwise in said axial plane, the first and second curvatures being connected together by a third connecting curvature defined in said equatorial plane, the projection of said first, second and third curvatures of the collapsed tire onto an axial plane defining the two-dimensional envelope of said collapsed tire by way of a total perimeter P of less than or equal to [3×(2H+A)], H being the height of the sidewall and A being the width of the tire.

A bead wire is said to be flexible when, flexed in its plane about a pulley of 10 mm radius, none of the rigid elements of which it is made suffers permanent deformation.

According to an embodiment of the invention, a crown reinforcement is inextensible when the load to deform it by 5% is at least equal to 40 N, and a bead wire is inextensible when the load to lengthen it by 1% is at least equal to 2500 N.

The tire according to an embodiment of the invention has the advantage that the number of tires per unit volume for tire transport and/or storage can be increased significantly, leading to substantial economic savings.

Specifically, the form of collapse according to an embodiment of the invention allows tires to be stored with an improvement in the range from 30 to 50% per $m^3$ notably with respect to the mode of packaging known as lacing, explained earlier. The tire according to an embodiment of the invention can be collapsed and stored loose, or in a case.

Another advantage of the tire of an embodiment of the invention is that it can be collapsed and kept collapsed, regardless of its size. Finally, the tire according to an embodiment of the invention can remain collapsed for the time it spends in transport and/or storage without any negative impact on its performance.

Another subject of the invention is a method for collapsing a tire in a twisted form, as defined previously, which comprises:
  simultaneously grasping the tire at a first and a second end of an axis passing through the diameter of the tire, and in
  carrying out, along said axis, a first rotation with a first angle of rotation of the first end and, depending on choice, either carrying out a second rotation with a second angle of rotation of the second end, said rotations being carried out in opposite directions, or keeping the second end fixed.

The absolute value of the result of the addition of the first angle and of the possible second angle of rotation is preferably between 300° and 360°. This is equivalent to a variation of between 5/6 and 6/6 of the first and/or second helix pitch.

Finally, a final subject of the invention is the use of the tire as defined hereinabove for a passenger vehicle.

Preferably, the first and second helix pitches of said first and second curvatures are identical or different.

The first and second helix pitches can be between 75 and 125% of the diameter of the tire. These percentage values are preferably obtained at the mean line of the bead wire.

Preferably, the tire according to the invention comprises a means for retaining in the collapsed position.

Preferably, the collapsing method also comprises applying at least one retaining means to the collapsed tire, which is preferably applied to the centre of the tire. The means may consist of a strap or webbing.

BRIEF DESCRIPTION OF DRAWINGS

The invention will now be illustrated with the aid of various detailed embodiments that follow and which do not in any way limit the subjects of the invention.

DETAILED DESCRIPTION OF SPECIFIC EMBODIMENTS

Figure 1:
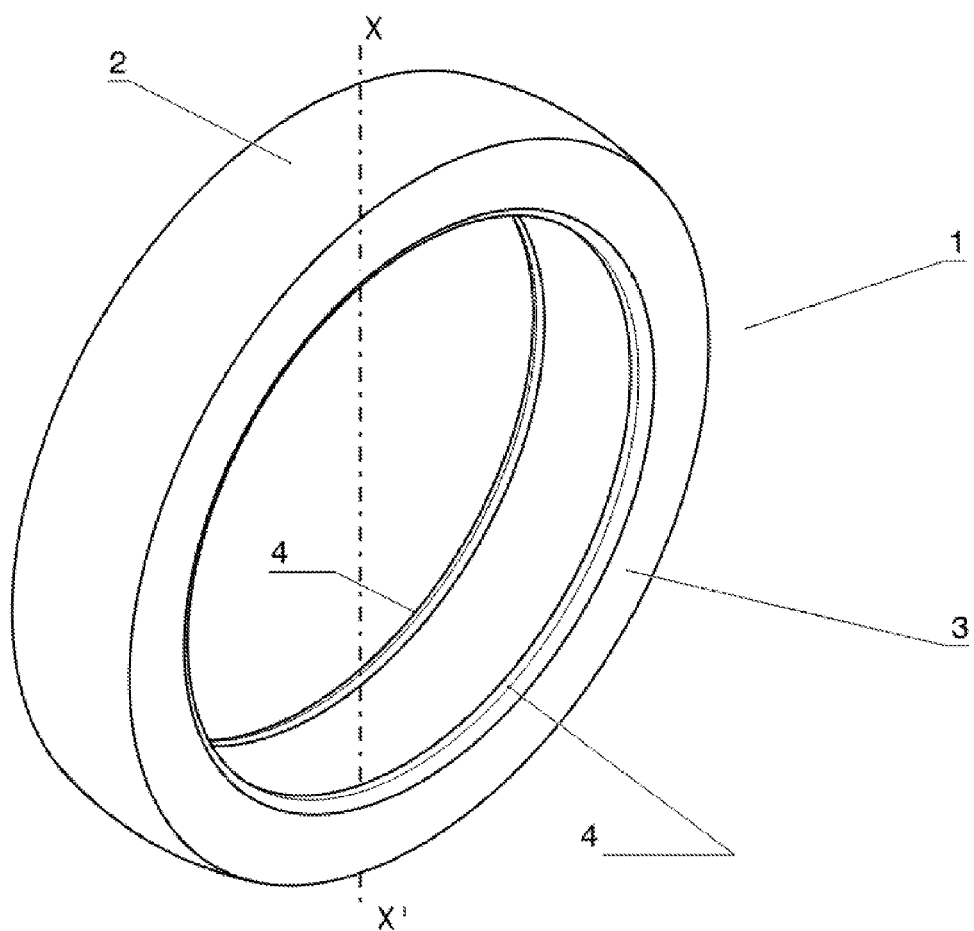
FIG. 1 shows a schematic three-dimensional view of an embodiment of a tire in the uncollapsed state.

FIG. 1 shows a passenger vehicle tire, of general reference 1, in the uncollapsed state, comprising a tread 2 extended radially inwards by two sidewalls 3 connected to two beads 4, said beads comprising a bead wire (reinforcing element) (not shown).

Radially on the inside of said tread 2 there are, in succession, an inextensible crown reinforcement (not shown) and a carcass reinforcement (not shown). Each bead 4 has at least one bead wire. This bead wire, which defines a mean line forming a substantially circular closed curve in a circumferential plane, is inextensible and flexible.

The bead wire preferably consists of steel, and is in the form of a saturated and unwrapped cord formed of filaments, said filaments having a diameter equal to 0.18 mm. The cord is a 19.18 metal cord of formula (1+6+12), the layers being formed with the same direction of rotation and with identical pitches equal to 10 mm. Such a cord allows the formation of a bead wire by winding 3 to 16 turns. The number of turns required is dependent on the size of tire and its use.

The mean thickness $E_F$ of the sidewall of the tire according to an embodiment of the invention, measured at the point located in the middle, in the radial direction, between the high point of the bead wire and the low point of the tire on the equatorial plane, is between 2.6 and 7 mm.

The mean thickness $E_S$ of the crown reinforcement 4, measured in the equatorial plane, is between 2 and 7 mm.

Figure 2:
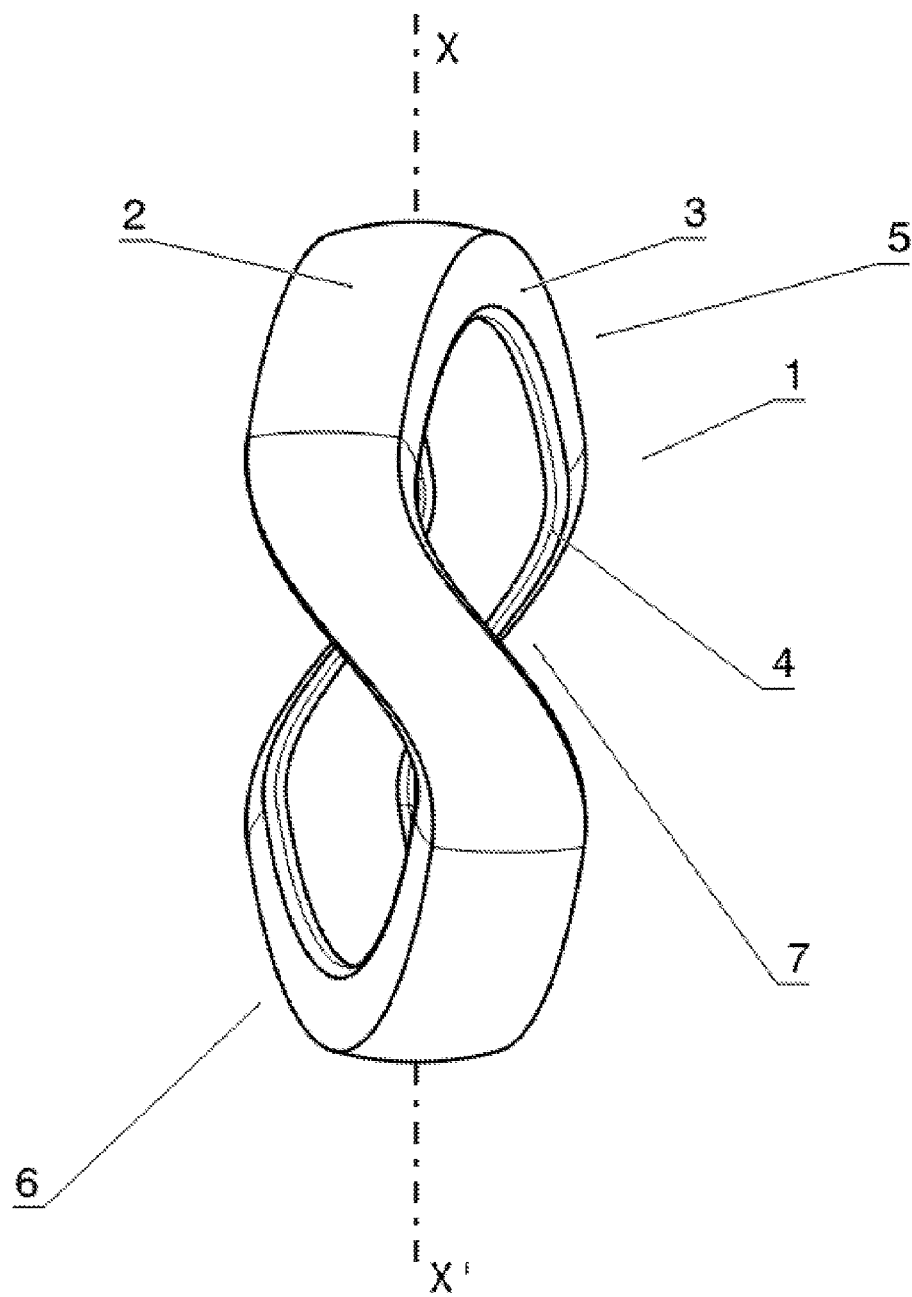
FIG. 2 shows a schematic three-dimensional view of a tire which has started to be collapsed.
Figure 3:
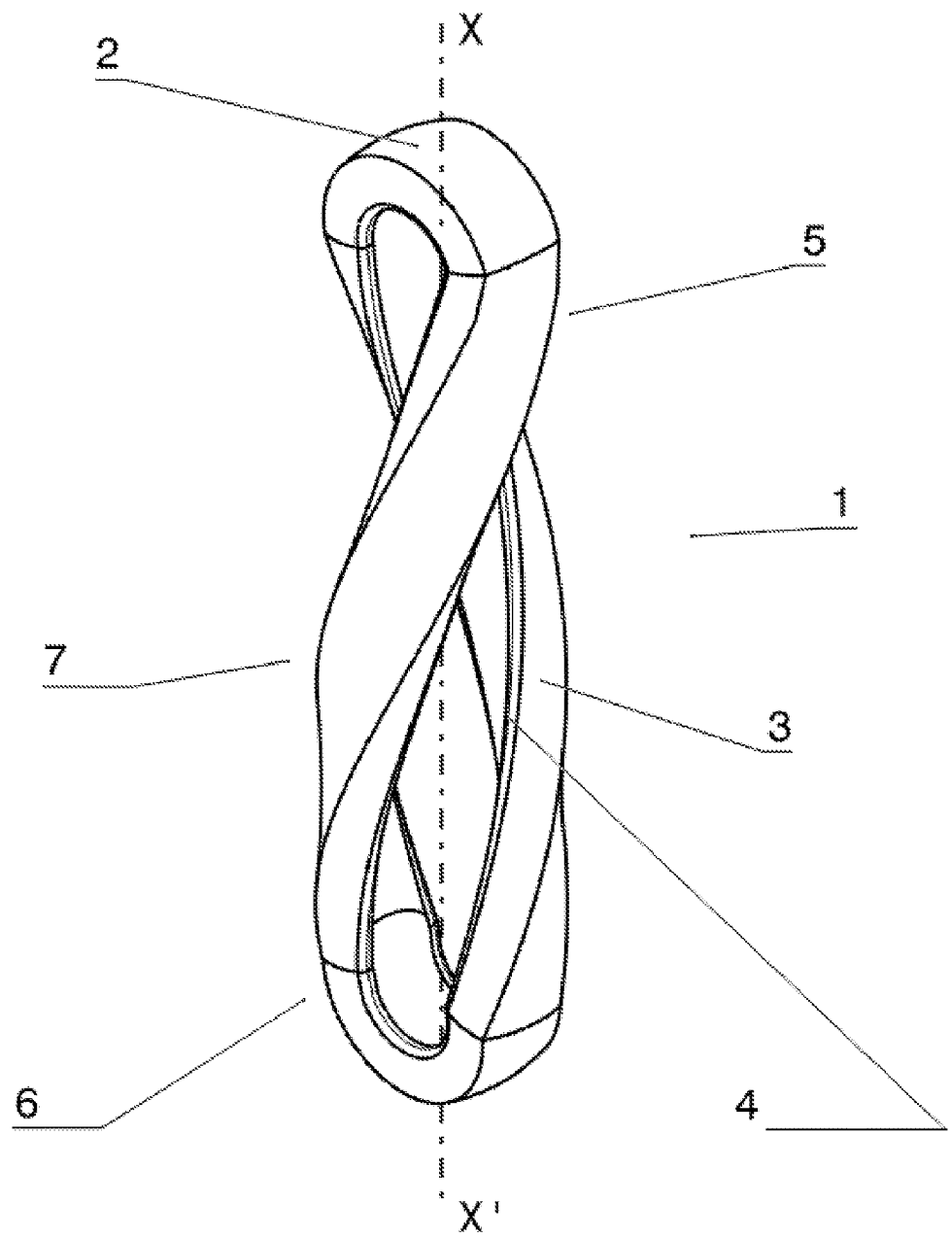
FIG. 3 shows a schematic three-dimensional view of a collapsed tire.

FIG. 2 shows a tire, for example of trade reference 185/65 R 14, which has started to be collapsed, and FIG. 3 shows the same tire after it has been collapsed. The tire is collapsed by first of all grasping two ends, comprising a portion of the tread 2 and a portion of the sidewalls 3, said ends being diametrically opposed and located on the axis XX', said axis XX' corresponding to the diameter of the tire and thus passing through its centre.

Next, two rotations are carried out, in opposite directions, at these two points about said axis XX'. The first rotation has a first angle and the second rotation has a second angle. The result of the addition of the absolute values of the first and second angles is preferably equal to 300°.

After collapsing has been carried out, the mean line of the bead wire (reinforcing element) present in the bead 4 then simultaneously defines a first curvature, of general reference 5, defined in the equatorial plane and having a first helix pitch of 61 cm extending anticlockwise in the axial plane, and a second curvature, of general reference 6, defined in the equatorial plane and having a second helix pitch of 65 cm extending clockwise in the axial plane.

Figure 4:
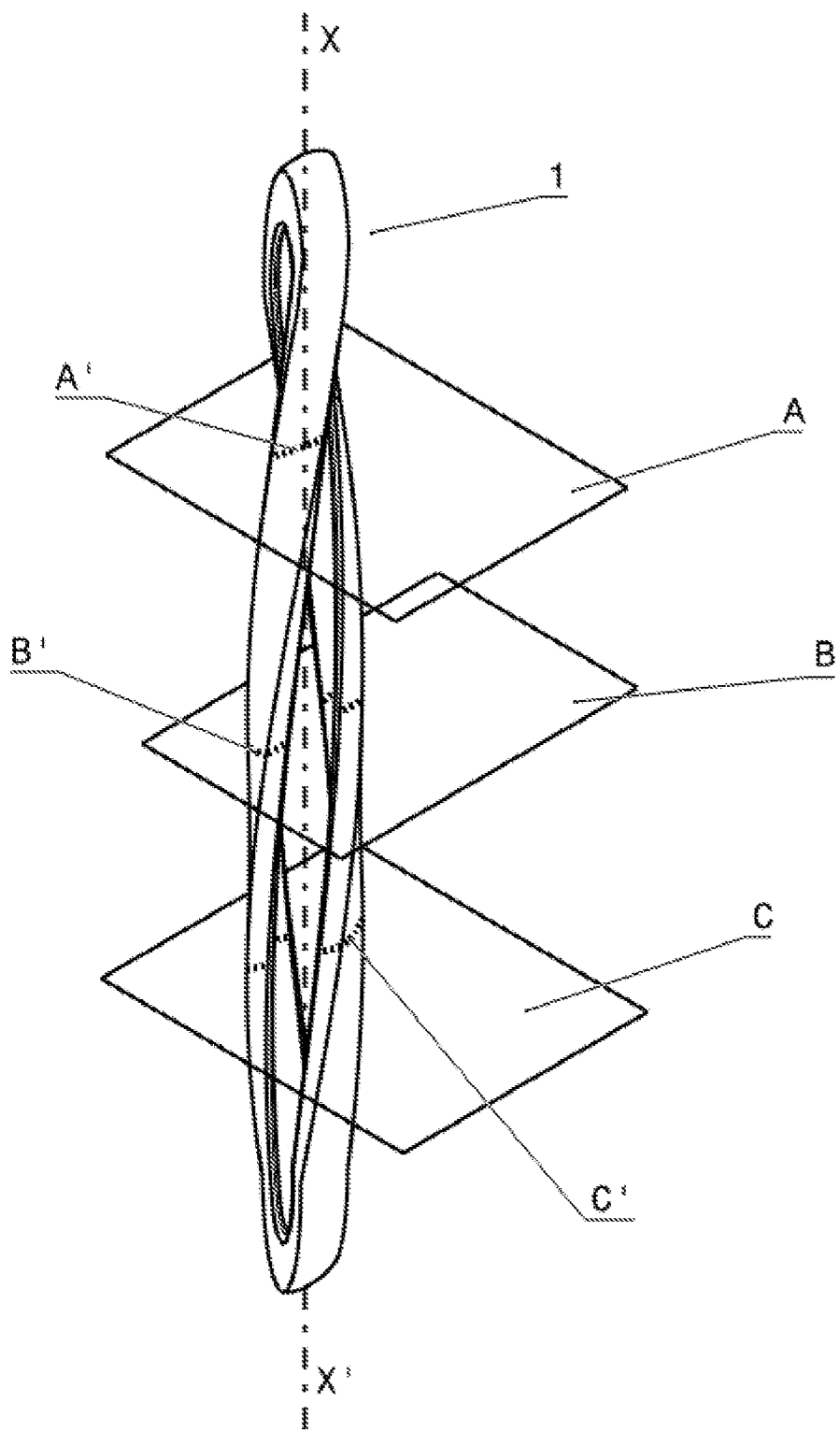
FIG. 4 shows a schematic view of a collapsed tire according to FIG. 3 with different axial planes perpendicular to the axis XX'.

As FIG. 4 shows, three axial planes A, B and C have been depicted. The axial planes A and C are disposed more or less at the first curvature 5 and the second curvature 6, respectively, and are perpendicular to the axis XX'. The axial plane B, perpendicular to the axis XX', is disposed more or less at the third curvature 7.

The intersection of each of the axial planes A, B and C with the collapsed tire makes it possible to define a two-dimensional envelope of the tire after it has been collapsed according to an embodiment of the invention.

This envelope is defined by projecting onto each axial plane A, B and C the entirety of the impression corresponding to the position of said plane of the collapsed tire. Only all the convex parts relating to the collapsed tire are extracted from these impressions.

Figure 5:
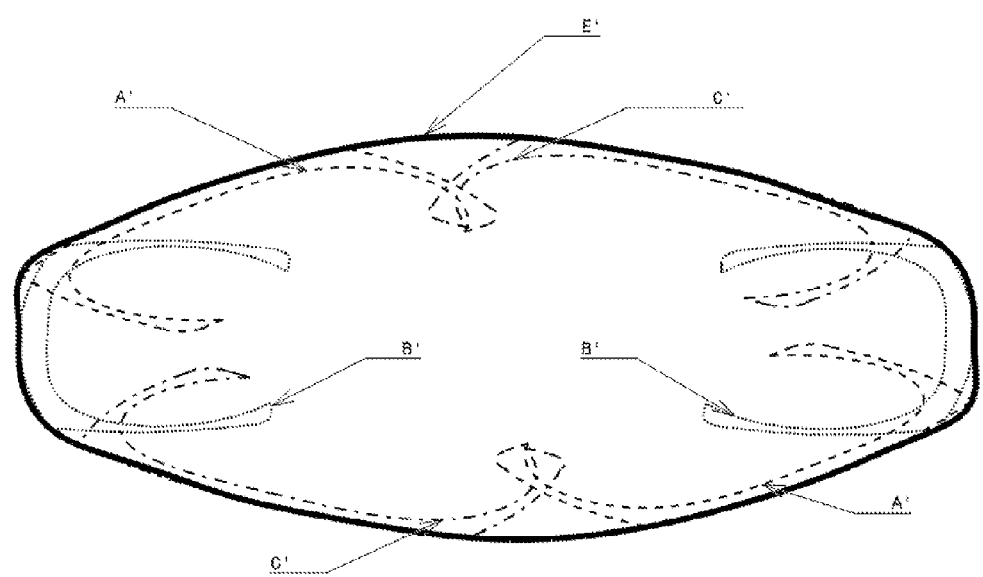
FIG. 5 shows a schematic view of the two-dimensional envelope of a collapsed tire according to FIG. 3.

FIG. 5 shows the two-dimensional envelope of all of the convex parts extracted and projected onto each axial plane A, B and C of the collapsed tire. As can be seen in this figure, this envelope has an approximately rectangular shape.

The total perimeter of this envelope is obtained by way of the formula:

$P<3\times(2H+A)$ where A is the width of the tire in the uncollapsed state and H is the height of its sidewall.

Preferably, $P<2.5\times(2H+A)$.

The invention claimed is:

1. A method for collapsing a collapsible tire, the tire having at least one inextensible crown reinforcement with a thickness of between 2 mm and 7 mm, having a sidewall with a thickness of between 2.6 mm and 7 mm, having a width that is at least 185 mm, and the tire not being mounted on a rim, said method comprising the steps of:

simultaneously grasping the tire at a first and a second end of an axis which passes diametrically across the center of the tire, and carrying out, along said axis, a first rotation with a first angle of rotation of the first end and, depending on choice, either carrying out a second rotation with a second angle of rotation of the second end, said first rotation and said second rotation being carried out in opposite directions, or keeping the second end fixed.

2. The method according to claim 1, wherein addition of the absolute values of the first angle and of said possible second angle of rotation results in a value that is between 300° and 360°.

3. The method according to claim 1, further comprising applying at least one retaining means to the collapsed tire.

4. The method according to claim 3, wherein the retaining means is applied to the center of the collapsed tire.

* * * * *